United States Patent Office 3,278,546
Patented Oct. 11, 1966

3,278,546
PHOSPHORANYLIDENEAMINO-TRIAZOLEDICAR-
BOXIMIDES AND A SYNTHESIS THEREOF
William Lindsay Mosby, North Plainfield, N.J., assignor
to American Cyanamid Company, Stamford, Conn., a
corporation of Maine
No Drawing. Filed July 23, 1965, Ser. No. 474,471
3 Claims. (Cl. 260—308)

This invention relates to a new class of organophosphorus compounds and to the method of preparing them. More particularly, it relates to phosphoranylideneaminotriazoledicarboximides of the following Formulae I and II:

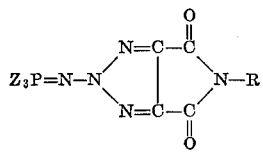

(I)

and

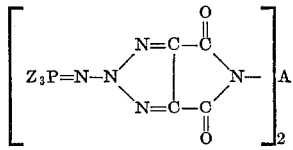

(II)

wherein R is aryl (such as phenyl, naphthyl and biphenyl); Z is lower alkyl, aryl of up to two rings, lower dialkylamino, morpholino, piperidino, piperazino, etc.; and A is arylene, such as phenylene. The cyclic groups may be substituted by inert substituents such as lower alkyl, lower alkoxy, halo (e.g., chloro), nitro and lower alkanamido (e.g., acetamido), etc.

The compounds of Formulae I and II are obtained by the reaction of a diazido-maleimide of Formula III or Formula IV respectively, with a lower alkylphosphine, an arylphosphine, or a phosphorous triamide.

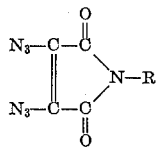

(III)

and

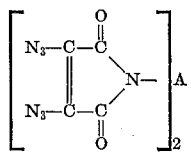

(IV)

The reaction is carried out in an inert solvent such as toluene, methyl chloride, ethyl acetate, ethylene dichloride, benzene, chloroform, chlorobenzene, diethyl ether, dibutyl ether, carbon tetrachloride, nitromethane, etc. The reaction temperatures may be between 20° and 100° C. Normally it is advantageous to carry out the reaction at the reflux temperature of the reaction mixture.

By theory, equivalent amounts of diazido-maleimide and the phosphorus reagent are required. However, either reactant may be used in slight excess.

The desired phosphoranylideneamino-triazoledicarboximides are obtained as colored precipitates. They may be separated from their respective reaction mixtures by filtration, or they can be obtained by evaporating the solvent from the reaction mixture. They can then be purified by conventional recrystallization techniques.

The compounds of this invention are useful as fluorescent pigments.

Among the diazido-maleimides of Formulae III and IV which may be used in preparing the compounds of this invention are the following:

2,3-diazido-N-phenylmaleimide,
2,3-diazido-N-o-tolylmaleimide,
2,3-diazido-N-2,4-xylylmaleimide,
2,3-diazido-N-p-methoxyphenylmaleimide,
2,3-diazido-N-p-propoxyphenylmaleimide,
2,3-diazido-N-p-chlorophenylmaleimide,
2,3-diazido-N-p-fluorophenylmaleimide,
2,3-diazido-N-p-nitrophenylmaleimide,
2,3-diazido-N-p-acetamidophenylmaleimide,
2,3-diazido-N-p-biphenylylmaleimide,
2,3-diazido-N-1-naphthylmaleimide,
2,3-diazido-N-2-naphthylmaleimide,
2,3-diazido-N-(4-nitro-1-naphthyl)maleimide, etc.

Also, N,N-p-phenylenebis(2,3 - diazidomaleimide), etc., may be used.

The diazido-maleimides are prepared by the procedures described in J. Am. Chem. Soc. 78, 145 (1956), and Tetrahedron 19, 1591 (1963).

Among the alkylphosphines which may be employed are the lower alkylphosphines such as trimethylphosphine, triethylphosphine, and tributylphosphine.

Among the triarylphosphines which may be used are triphenylphosphine, the tritolylphosphines such as tri-o-tolylphosphine, the chlorophenylphosphines such as tris-(4-chlorophenyl)phosphine, the alkoxyphenylphosphines such as tris(2 - methoxyphenyl)phosphine, trinaphthylphosphines, and also mixed triarylphosphines such as diphenyl-p-tolylphosphine, diphenyl-4-methoxyphenylphosphine, diphenyl-4-chlorophenylphosphine, phenyl-bis-p-tolylphosphine, 4-chlorophenyl-bis-p-tolylphosphine.

The phosphorous triamides which may be used include phosphorous tripiperidide, phosphorous trimorpholide, N,N,N',N',N'',N''-hexaethylphosphorous triamide, N,N,-N',N',N'',N''-hexaisopropylphosphorous triamide.

In the following examples, the parts are by weight.

EXAMPLE 1

N-phenyl-2-[(triphenylphosphoranylidene)amino]-2H-
1,2,3-triazoledicarboximide

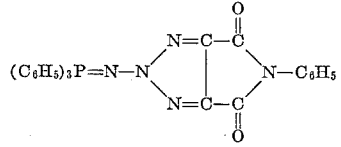

A solution of 2,3-diazido-N-phenylmaleimide (2.0 parts) in methylene chloride (40 parts) is stirred at the reflux temperature while a solution of triphenylphosphine (4.2 parts) in methylene chloride (25 parts) is added slowly. The solvent is removed from the deep red solution, and the orange-brown residue is washed with benzene. The product, after crystallization from nitromethane, appears as yellow crystals melting at 213–214.5° C.

Other compounds of this invention are obtained by following the foregoing procedure except for the substitution of equimolar amounts of different phosphorous compounds and/or maleimides. Representative alternative materials and the resulting products are shown in Examples 2–9 tabulated below.

EXAMPLES 2–9

| No. | Z₃P — Z | (maleimide) R | Product |
|---|---|---|---|
| 2 | Methyl | Phenyl | (CH₃)₃P=N—N[ring]N—C₆H₅ |
| 3 | p-Chlorophenyl | do | (p—Cl—C₆H₄)₃P=N—N[ring]N—C₆H₅ |
| 4 | Naphthyl | o-Tolyl | (C₁₀H₇)₃P=N—N[ring]N—(o-CH₃-C₆H₄) |
| 5 | Morpholino | 2,4-xylyl | [morpholino]₃P=N—N[ring]N—(2,4-(CH₃)₂C₆H₃) |
| 6 | Piperidino | p-Methoxyphenyl | [piperidino]₃P=N—N[ring]N—C₆H₄—OCH₃ |
| 7 | Diethylamino | p-Chlorophenyl | [(C₂H₅)₂N]₃P=N—N[ring]N—C₆H₄—Cl |
| 8 | Phenyl | p-Nitrophenyl | [C₆H₅]₃P=N—N[ring]N—C₆H₄—NO₂ |
| 9 | do | 1-Naphthyl | [C₆H₅]₃P=N—N[ring]N—(1-naphthyl) |

EXAMPLE 10

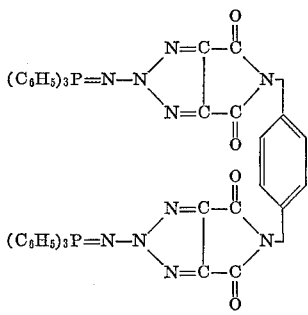

The procedure of Example 1 is followed substituting one half the molecular equivalent of N,N'-p-phenylenebis(2,3-diazidomaleimide) for the 2,3-diazido-N-phenylmaleimide.

I claim:
1. A compound of the formulae:

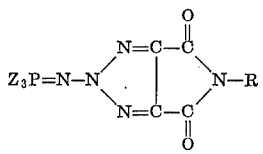

and

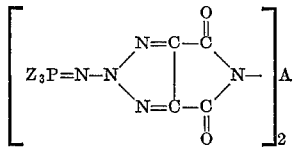

wherein R is aryl of up to two six-membered rings; Z is a member selected from the group consisting of lower alkyl, aryl of up to two six-membered rings, lower dialkylamino, morpholino, piperidino and piperazino; and A is a phenylene radical.

2. The compound N-phenyl-2-[(triphenylphosphoranylidene)amino]-2H-1,2,3-triazoledicarboximide.

3. The process of preparing a compound of claim 1 which comprises reacting in an inert solvent at a temperature between 20° and 100° C. equimolar amounts of a compound of the formulae:

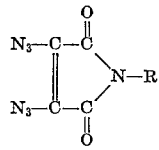

and

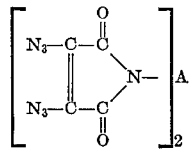

wherein R and A are as defined in claim 1, and a phosphorous compound of the formula:

$$P(Z)_3$$

wherein Z is as defined in claim 1; and separating the product thus formed.

No references cited.

ALEX MAZEL, *Primary Examiner.*

RICHARD J. GALLAGHER, *Assistant Examiner.*